United States Patent [19]

Gonsalves et al.

[11] Patent Number: 4,582,712

[45] Date of Patent: Apr. 15, 1986

[54] GELATIN-FREE FROZEN CONFECTIONS

[75] Inventors: Alexander A. Gonsalves, Yardley, Pa.; Joseph J. Griffin, Plainsboro; Richard A. Smith, Englishtown, both of N.J.

[73] Assignee: General Foods Corporation, White Plains, N.Y.

[21] Appl. No.: 667,185

[22] Filed: Nov. 1, 1984

[51] Int. Cl.$^4$ .......................... A23G 9/26; A23G 9/00
[52] U.S. Cl. ..................................... 426/134; 426/567; 426/573; 426/577; 426/249; 426/804
[58] Field of Search ............... 426/567, 573, 804, 249, 426/134, 577

[56]  References Cited

U.S. PATENT DOCUMENTS

| | | | |
|---|---|---|---|
| 2,823,129 | 2/1958 | Steinitz | 426/567 |
| 2,876,104 | 3/1959 | Bliudzius | 426/804 |
| 3,702,768 | 11/1972 | Finucane et al. | 99/136 |
| 3,792,182 | 2/1974 | Carpigiani | 426/250 |
| 3,928,649 | 12/1975 | Cobb | 426/804 |
| 3,991,224 | 11/1976 | Sturms | 426/804 |
| 4,216,242 | 8/1980 | Braverman | 426/249 |
| 4,297,379 | 10/1981 | Topalian et al. | 426/565 |

OTHER PUBLICATIONS

Food Hydrocolloids, vol. I, M. Glicksman, 1982, pp. 4–11.

Primary Examiner—Jeanette Hunter
Attorney, Agent, or Firm—Basam Nabulsi; Thomas R. Savoie; Daniel J. Donovan

[57]  ABSTRACT

A high quality, gelatin-free frozen confection which is ready-to-eat at freezer temperatures is disclosed. The frozen confection maintains its shape on a stick during normal consumption, exhibits excellent storage stability, and delivers a refreshing, texturally-pleasing eating experience. The elimination of gelatin from previous frozen confection formulations has been found in the invention to improve upon the heavy-bodied texture of past formulations, and to enable a reduction in the total hydrocolloid level required to fully bind the water in the frozen confection.

45 Claims, No Drawings

GELATIN-FREE FROZEN CONFECTIONS

BACKGROUND OF THE INVENTION

This invention relates to high quality frozen desserts and more particularly to a dynamically frozen confection. This unique frozen confection is able to maintain its shape on a stick during a period of normal consumption, exhibits excellent frozen storage stability and delivers a refreshing, texturally-pleasing eating experience.

It has long been a desire in the art to supply consumers with a light-bodied, refreshing frozen confection which does not drip during normal consumption and which provides a pleasurable taste and mouthfeel to the consumer. The failings of dairy-based confections, particularly ice milk and ice cream, in this area have been long recognized. Ice cream, for example, has an undesirable tendency to drip during consumption. Frozen pops are known to the art, but the poor textural quality and tendency of frozen pops to drip during consumption evidence the need for an improvement to the art.

Topalian et al. in U.S. Pat. No. 4,297,379 disclose a ready-to-eat frozen aerated product which does not weep during thawing and which claims to provide an acceptable taste and mouthfeel to consumers. However, it has been found through expert evaluations that the Topalian et al. frozen products are heavy-bodied and that a more refreshing frozen confection is desired by consumers. It has further been found according to the present invention that it is the use of gelatin, as taught by Topalian et al., that results in a heavy-bodied texture.

It is an object of the present invention to produce a high quality, dynamically frozen confection with no gelatin added.

It is also an object that the frozen confection be light-bodied and refreshing.

It is a further object that the frozen confection maintain its shape on a stick and not drip during normal consumption, and exhibit excellent frozen storage stability.

SUMMARY OF THE INVENTION

It has been found that the objects of the invention are achieved by the formulation of a gelatin-free, hydrocolloid-containing mix which is dissolved in water, dynamically frozen, and shaped. The frozen confection thus made is comprised of a hydrocolloid at a level of 0.1% to 1.8% by weight, and preferably from 0.3% to 0.6% by weight, stabilizer, food acid, sweetener and, optionally, freezing point depressant, flavor and/or color. The aqueous blend of above-listed ingredients is dynamically frozen either with or without aeration, to an overrun of from 0% (i.e., no measurable overrun) to 250% overrun, and typically with aeration to an overrun of about 5% to 30%. Frozen confections made according to the invention have been found to deliver a light-bodied, pleasurable taste and mouthfeel to consumers, while demonstrating good frozen storage stability.

DETAILED DESCRIPTION OF THE INVENTION

The vast utility of hydrophilic colloids in the food industry is known to those skilled in the art. Gelation is only one of the many functions that may be served by a hydrocolloid in the dessert and confectionary products area. Gelation involves the association or cross-linking of hydrocolloid polymer chains to trap or immobilize water in a three-dimensional continuous network which is resistant to flow. The gelation properties of hydrocolloids are known to be so individually distinct that it is well-known in the art that hydrocolloids employed for their gelation properties are interchangeable only in the rarest instances. See *Food Hydrocolloids,* Vol. I, M. Glicksman, 1982, CRC Press, Inc., pp. 4-11. Prior to the present invention, it was believed in the art that gelatin and, in fact, gelatin at a critical level, was required in the formulation of a frozen ready-to-eat dessert pop capable of maintaining its shape on a stick. The present invention advances the art by identifying hydrocolloid systems which, absent gelatin, produce frozen desserts which maintain their shape on a stick during normal consumption, exhibit good frozen storage stability, and replace what is termed a heavy-bodied mouthfeel in gelatin-containing frozen confections with a light-bodied, refreshing eating experience.

The hydrocolloid used in the hydrocolloid mix to produce the improved frozen confection of this invention includes one of or a combination of hydrocolloids selected from the group consisting of low methoxyl pectin, carrageenan, and alginate. By low methoxyl pectin is typically meant a pectin that contains about a 27 to about a 45 degree of methoxylation (DM), as for example commercially available Hercules ® Genu Low-Methoxyl Pectins. It has been found that proper gelation is achieved by employing a hydrocolloid system from the above grouping at a level of from 0.1% to 1.8% of the total frozen confection by weight. Typically, said hydrocolloid system is added at a level of from 0.3% to 0.7% by weight of the confection, with low methoxyl pectin, the preferred hydrocolloid for the invention, being at the upper end of this typical range. A metal ion such as a potassium or a calcium salt is typically used as a gelation catalyst for the hydrocolloid system, preferably tricalcium citrate.

Additionally, the hydrocolloid mix of the present invention typically contains a stabilizer system chosen from the group consisting of guar gum, xanthan gum, locust bean gum, gum arabic, carboxymethyl cellulose, methyl cellulose, hydroxy propyl cellulose, hydroxy propyl methyl cellulose, and collagen. The stabilizer system is generally employed at a level such that the combination of the stabilizer system and the hydrocolloid system comprise by weight less than 2.0% of the frozen confection, typically less than 1.8%, preferably less than 1.5%, and most preferably less than 1.0% of the frozen confection. The preferred lower weight percentages for the combined hydrocolloid/stabilizer system is desired to deliver the optimal texture and mouthfeel to the frozen confection. However, as will become apparent to one working in the art, this desire for optimal texture and mouthfeel must be balanced against the equally essential desire for a frozen confection which does not drip during normal consumption. Thus, a slightly higher hydrocolloid/stabilizer system level than that defined as preferred, i.e., greater than 1.5% by weight of the frozen confection, may be necessary to accomplish the latter objective in a given embodiment of the present invention, but in no embodiment should it be necessary to exceed a hydrocolloid/stabilizer system level of 2.0% of the frozen confection in fully satisfying the no-drip object of the invention. Even at a 2.0% hydrocolloid/stabilizer level, as defined above, it has been found that a frozen confection with a light-body and excellent texture is produced.

The reduced level at which the hydrocolloid stabilizer system of the present invention is employed (as compared to prior art systems using gelatin) is enabled because the hydrocolloid/stabilizer system is used to its full gelation potential in the invention. It has been found that certain hydrocolloid combinations are inefficient for gelation, as for example gelatin and xanthan gum, because the one hydrocolloid interferes with the other in its functional attempt to bind water. Due to this functional interference, at least partly attributable to reaction between the components, a higher overall hydrocolloid level is required to fully bind the available water and enable the frozen confection to maintain its shape on a stick. The operable group of hydrocolloid/stabilizer systems for the present invention however may be used in any combination with full gelation performance (i.e., no functional interferences). One particularly suitable hydrocolloid/stabilizer combination consists of carrageenan, xanthan gum, locust bean gum, and hydroxy propyl methyl cellulose. In this combination a high quality frozen confection with all the desired physical and organoleptic properties is produced at a total hydrocolloid/stabilizer level of 0.28% to 0.39% by weight of the frozen confection by combining the constituents as follows: Carageenan 0.18–0.22%, Xanthan Gum 0.02–0.04%, Locust Bean Gum 0.02–0.04%, Hydroxy Propyl Methyl Cellulose 0.06–0.09%.

A food grade acid is generally employed in the hydrocolloid mix to improve the taste of the frozen confection. The food grade acid may be chosen from the group consisting of adipic, fumaric, citric, tartaric or any other food grade acid known to the art. A combination of food acids from the above group is suitable for the invention. Generally, food grade acid is added at a level of from about 0.2% to about 0.7% by weight of the frozen confection, and typically from about 0.3% to about 0.6% by weight. A buffer, such as trisodium citrate, disodium phosphate, potassium phosphate, sodium tartrate, etc., may additionally be included for pH process control purposes. The pH of the confection generally ranges from 3.0–5.0 and is not considered critical to the functionality of the invention, but rather is important organoleptically.

A sweetener is an important component of any frozen dessert in order that the dessert be made pleasingly palatable for consumers. Carbohydrate sweeteners, such as sucrose, dextrose, fructose, glucose, etc., are most often employed for this purpose. Carbohydrate sweeteners are generally included at a level of about 5 to 50% by weight of the frozen confection, and preferably 10 to 20% by weight. Carbohydrate sweeteners so employed additionally act to depress the freezing point of the frozen confection such that the frozen confection is ready-to-eat at freezer temperatures. Optionally, freezing point depressants such as polyhydric alcohols may be employed to further depress the frozen confection freezing point. However, it is preferred that said carbohydrate sweeteners not be supplemented with specific freezing point depressants.

In a preferred embodiment of the invention, a non-nutritive sweetener such as saccharin, cyclamate, acetosulfam, aspartame or a combination thereof, may be used in place of carbohydrate sweeteners. Generally, said non-nutritive sweeteners is added at a level of about 0.03% to about 0.15% by weight, and typically from about 0.06% to about 0.10% by weight of the frozen confection. A freezing point depressant is necessary in the absence of carbohydrate solids to depress the freezing point of the frozen confection. A freezing point depressant may be chosen from the group consisting of glycerin, propylene glycol and polyhydric alcohols, and is generally employed at a level of about 2% to about 5% of the frozen confection. Frozen confections free of carbohydrate sweeteners produced according to this invention have generally been found to contain less than 15 metabolizable calories in a typical 1.8 fluid ounce serving with 20% overrun by volume, and preferably less than 10 metabolizable calories in a 1.8 fluid ounce serving having 20% overrun by volume.

Natural and/or artificial flavors (e.g. fruit flavors) may also be added to the hydrocolloid mix at levels as would be obvious to those skilled in the art. Also, natural and/or artificial colors may similarly be employed. Optionally, natural fruit juices such as strawberry, cherry, orange, grape, blueberry, apple, watermelon, banana, pineapple, cranberry, blackberry, lemon, grapefruit, lime, coconut, pear, peach, etc. may be incorporated to the frozen confection at levels ranging from about 0.1% to 15% and typically from about 7% to 13% by weight of the final frozen confection.

In a typical process for producing the products of this invention, the hydrocolloid mix is dissolved in water and mixed sufficiently to form a homogeneous solution. The temperature of the water is not critical, though it is generally elevated to greater than 50° F. (10° C.) to benefit the solubilization of the hydrocolloid mix. Temperatures of greater than about 160° F. (71.1° C.) are useful for pasteurizing the solution. The hydrocolloid/stabilizer systems of the invention have been found to be able to bind a very high level of water after gelation. Generally, water may comprise from about 50% to about 97% of the frozen confection by weight. However, it is preferred that a non-nutritive sweetener be employed rather than carbohydrate sweeteners. Thus, in a preferred embodiment water is present at a level of from about 90% to about 95%, and most preferably from about 92% to about 94% by weight. Thus, a preferred frozen confection produced according to the invention contains as few as about 10% total solids, and most preferably contains between about 6% and 8% total solids by weight.

After the hydrocolloid mix is blended with water such that a homogeneous aqueous solution is formed, said solution enters a freezing step. The morphology of ice crystals formed during the freezing step has been found to be critical to the texture and mouthfeel of the final frozen confection product, and thence the response of consumers to the invention. Dynamic freezing, as for example by agitation, has been found to produce predominantly spherical ice crystals which yield a preferred mouthfeel for consumers, as compared to elongated, striated ice crystals which are typically produced by quiescent freezing. Thus, dynamic freezing is preferred over quiescent freezing for the present invention.

Desired spherical ice crystals may be accomplished by dynamic freezing of the homogeneous aqueous solution either with or without aeration. The overrun by volume of the frozen product may range from 0% (i.e., no measurable overrun) for non-aerated dynamic freezing to about 250% for heavily aerated dynamic freezing. Typically, a high quality frozen confection is aerated such that it contains from about 5% to about 30% overrun, and preferably from about 15% to about 25% overrun by volume.

The freezing is generally accomplished by first partially freezing the homogeneous aqueous mixture at a temperature of from about 10° F. (−12° C.) to about 32° F. (0° C.), and preferably 15° F. (−10° C.) to about 29° F. (−1° C.), while agitating and optionally aerating. This initial freezing step is carried out in any suitable heat exchange piece of equipment that is known in the art, as for example a scraped surface heat exchanger. Generally, less than 50% of the water in the mix is frozen during this initial freezing step, and typically only about 10% is frozen. The partially frozen mix is then shaped, for example, by extrusion, sheeting and cutting, and then mold filling or cup filling. During or after the shaping step, a stick may optionally be inserted into the partially frozen mix. Following shaping (and stick insertion, if desired), the shaped mix is frozen such that the core of the shaped mix is less than about 10° F. (−10° C.), packaged, and stored for future consumption. It has been found that colder final freezing temperatures (i.e., less than 10° F.) yield smaller ice crystal sizes, which are preferred from a textural standpoint by consumers. Thus, it is a preferred embodiment of the invention that the shaped mix be frozen at a final core temperature of about −10° F. (−23.3° C.) to about 0° F. (−18° C.).

EXAMPLE 1

A dynamically frozen, non-aerated composition was produced by combining the following ingredients:

| Ingredient | Weight Percent |
| --- | --- |
| Water | 94.2 |
| Glycerin | 4.0 |
| Low Methoxyl Pectin (35 D.M.) | 0.7 |
| Adipic Acid | 0.5 |
| Guar Gum | 0.2 |
| Aspartame | 0.1 |
| Tricalcium Citrate | 0.05 |
| Emulsifier | 0.05 |
| Flavor | 0.1 |
| Color | 0.1 |

In the above formulation, the "hydrocolloid mix" was comprised of all the listed ingredients except the water. The water was heated to 180° F. (82.2° C.) at which point the hydrocolloid mix was added and the mixture was blended until a homogeneous mixture was obtained. The mix was then partially frozen in a scraped surface heat exchanger which was fully sealed to prevent the admission of air. After being partially frozen in the scraped surface heat exchanger (about 10% of the water frozen), the mix was extruded into 1.8 fluid ounce ice molds and sticks were inserted. The resulting confections were frozen to a core temperature of −5° F. (−20.6° C.).

This frozen product possessed less than 13 metabolizable calories per 54 gram serving (1.8 fluid ounce serving with no measurable overrun) and delivered what was termed by an expert panel as a refreshing, light-bodied, texturally-pleasing eating experience. The confection was ready-to-eat at freezer temperatures (between 0° F. to about 20° F.) and did not weep or drip during normal consumption (10 to 15 minutes). The product also exhibited excellent frozen storage stability properties at freezer temperatures (0° F.).

EXAMPLE 2

A dynamically frozen aerated composition was produced by combining the ingredients of Example 1 in an identical manner. However, during the initial freezing step in the scraped surface heat exchanger, air was introduced to effect a 20% overrun by volume. Upon partial freezing (about 10% of the water frozen), the aerated mix was extruded into 1.8 fluid ounce ice pop molds and sticks were inserted. Thereafter the product was frozen to a core temperature of −5° F. (−20.6° C.).

This aerated frozen composition delivered what was termed by an expert panel to be a refreshing, light-bodied, texturally pleasing eating experience with less than 10 metabolizable calories per 45 gram serving (1.8 fluid ounces). The product did not drip during normal consumption and exhibited excellent frozen storage stability.

EXAMPLE 3

A dynamically frozen aerated composition was produced by combining the following ingredients:

| Ingredient | Weight Percent |
| --- | --- |
| Water | 84.2 |
| Orange Juice @ 11.8 Brix | 10.0 |
| Glycerin | 3.75 |
| Low Methoxyl Pectin (35 D.M.) | 0.7 |
| Adipic Acid | 0.5 |
| Guar Gum | 0.2 |
| Hydroxypropyl Methyl Cellulose | 0.1 |
| Aspartame | 0.1 |
| Locust Bean Gum | 0.1 |
| Fumaric Acid | 0.05 |
| Tricalcium Citrate | 0.05 |
| Emulsifier | 0.05 |
| Flavor | 0.1 |
| Color | 0.1 |

The water was heated to 180° F. (82.2° C.) at which point the other ingredients were added and the mixture was blended until a homogeneous mixture was obtained. The mix was then partially frozen in a scraped surface heat exchanger with sufficient air injected therein to effect a 20% overrun by volume. Upon partial freezing (about 10% of the water frozen) the aerated mix was extruded into 1.8 fluid ounce ice pop molds and sticks were inserted. Thereafter the product was frozen to a core temperature of −5° F. (−21.6° C.). This aerated frozen composition delivered what was termed by an expert panel to be a refreshing, light-bodied, texturally-pleasing eating experience with less than 15 metabolizable calories per 45 gram serving (1.8 fluid ounces). The product did not drip during normal composition and exhibited excellent frozen storage stability.

EXAMPLE 4

A dynamically frozen aerated composition was produced by combining the following ingredients:

| Ingredient | Weight Percent |
| --- | --- |
| Water | 80.3 |
| Sugar | 18.0 |
| Low Methoxyl Pectin (35 D.M.) | 0.7 |
| Adipic Acid | 0.5 |
| Guar Gum | 0.2 |
| Aspartame | 0.1 |
| Tricalcium Citrate | 0.05 |
| Emulsifier | 0.05 |
| Flavor | 0.1 |
| Color | 0.1 |

The water was heated to 180° F. (82.2° C.) at which point the other ingredients were added and the mixture was blended until a homogeneous mixture was obtained. The mix was then partially frozen in a scraped surface heat exchanger with sufficient air injected therein to effect a 20% overrun by volume. Upon partial freezing (about 10% of the water frozen) the aerated mix was extruded into 1.8 fluid ounce ice pop molds and sticks were inserted. Thereafter the product was frozen to a core temperature of −5° F. (−21.6° C.). This aerated frozen composition delivered what was termed by an expert panel to be a refreshing, light-bodied, texturally-pleasing eating experience. The product did not drip during normal composition and exhibited excellent frozen storage stability.

What is claimed is:

1. A process for producing a low-calorie, gelatin-free frozen confection which is ready-to-eat at freezer temperatures which comprises:
   (a) dissolving a hydrocolloid-containing mix in water at a temperature sufficient to dissolve the mix and form an aqueous mixture, said aqueous mixture comprised of:
      (i) freezing point depressant at a level of about 2% to 5% by weight,
      (ii) hydrophilic colloid at a level of about 0.1% to 1.8% by weight, and stabilizer such that the hydrophilic colloid and stabilizer combined do not exceed 2% by weight, said hydrophilic colloid being selected from the group consisting of low methoxyl pectin, carrageenan, alginate and combinations thereof,
      (iii) food acid at a level of about 0.02% to 0.10% by weight, and
      (iv) non-nutritive sweetener at a level of about 0.03% to 0.15% by weight;
   (b) dynamically cooling the aqueous mixture such that partial freezing is accomplished at a temperature of from 10° F. to 32° F., said hydrophilic colloid of step (a) being effective to maintain the ice crystal structure produced during said partial freezing,
   (c) shaping said partially frozen mixture, and
   (d) freezing said shaped mix to a temperature of less than 10° F.

2. Process of claim 1 wherein said aqueous mixture further comprises natural and/or artificial flavors.

3. Process of claim 1 wherein said aqueous mixture further comprises artificial color.

4. Process of claim 1 wherein said aqueous mixture further comprises a gelation catalyst in an amount effective to aid said hydrophilic colloid to gel.

5. Process of claim 4 wherein said gelation catalyst is a salt containing a metal ion chosen from the group consisting of calcium and potassium.

6. Process of claim 1 wherein said frozen confection has a total solids content of less than 10% by weight.

7. Process of claim 1 wherein said frozen confection has less than 15 metabolizable calories in a 1.8 fluid ounce serving.

8. Process of claim 1 wherein said dynamic freezing further comprises aeration.

9. Process of claim 8 wherein said aeration is sufficient to produce an overrun of 3% to 250% by volume.

10. Process of claim 8 wherein said aeration is sufficient to produce an overrun of 5% to 30% by volume.

11. Process of claim 8 wherein said aeration is sufficient to produce an overrun of about 20% by volume.

12. Process of claim 11 wherein said frozen confection has 10 or less metabolizable calories in a 1.8 fluid ounce serving.

13. Process of claim 1 wherein said freezing point depressant is selected from the group consisting of glycerin, propylene glycol, polyhydric alcohols, and combinations thereof.

14. Process of claim 1 wherein said low methoxyl pectin contains a 27 to 45 degree of methoxylation.

15. Process of claim 1 wherein said stabilizer is chosen from the group consisting of guar gum, xanthan gum, locust bean gum, gum arabic, carboxymethyl cellulose, hydroxy propyl methyl cellulose, hydroxy propyl cellulose, collagen and combinations thereof.

16. Process of claim 1 wherein said food acid is selected from the group consisting of adipic acid, fumaric acid, malic acid, citric acid, tartaric acid and combinations thereof.

17. Process of claim 1 wherein said non-nutritive sweetener is selected from the group consisting of acetosulfam, aspartame, saccharin and combinations thereof.

18. Process of claim 1 wherein said water is heated to a temperature greater than 160° F. prior to dissolving said hydrocolloid-containing mix.

19. Process of claim 1 wherein a stick is inserted to enable hand-held eating after the partially frozen mixture is shaped.

20. Process of claim 1 wherein said dynamic cooling is accomplished in a scraped surface heat exchanger.

21. A process for producing a gelatin-free frozen confection which is ready-to-eat at freezer temperatures which comprises:
   (a) dissolving a hydrocolloid-containing mix in water at a temperature sufficient to dissolve the mix and form an aqueous mixture, said aqueous mixture comprised of:
      (i) freezing point depressant at a level of about 2% to 5% by weight,
      (ii) hydrophilic colloid at a level of about 0.1% to 1.8% by weight, and stabilizer such that the hydrophilic colloid and stabilizer combined do not exceed 2% by weight, said hydrophilic colloid being selected from the group consisting of low methoxyl pectin, carrageenan, aliginate and combinations thereof,
      (iii) food acid at a level of about 0.02% to 0.10% by weight,
      (v) non-nutritive sweetener at a level of about 0.03% to 0.15% by weight; and
      (v) fruit juice at a level of less than 15% by weight;
   (b) dynamically cooling the aqueous mixture such that partial freezing is accomplished at a temperature of from 10° F. to 32° F., said hydrophilic colloid of step (a) being effective to maintain the ice crystal structure produced during said partial freezing,
   (c) shaping said partially frozen mixture, and
   (d) freezing said shaped mix to a temperature of less than 10° F.

22. Process of claim 21 wherein said aqueous mix further comprises natural and/or artificial flavors and artificial colors.

23. Process of claim 21 wherein said aqueous mixture further comprises a gelation catalyst in an amount effective to aid said hydrophilic colloid to gel.

24. Process of claim 21 wherein said dynamic freezing further comprises aeration.

25. Process of claim 24 wherein said aeration is sufficient to produce an overrun of 3% to 250% by volume.

26. Process of claim 24 wherein said aeration is sufficient to produce an overrun of 5% to 30% by volume.

27. Process of claim 24 wherein said aeration is sufficient to produce an overrun of about 20% by volume.

28. Process of claim 27 wherein said frozen confection has 15 or less metabolizable calories in a 1.8 fluid ounce serving.

29. Process of claim 21 wherein said freezing point depressant is selected from the group consisting of glycerin, propylene glycol, polyhydric alcohols and combinations thereof.

30. Process of claim 21 wherein said low methoxyl pectin contains a 27 to 45 degree of methoxylation.

31. Process of claim 21 wherein said food acid is selected from the group consisting of adipic acid, fumaric acid, malic acid, citric acid, tartaric acid and combinations thereof.

32. Process of claim 21 wherein said stabilizer is chosen from the group consisting of guar gum, xanthan gum, locust bean gum, gum arabic, carboxymethyl cellulose, hydroxy propyl methyl cellulose, hydroxy propyl cellulose, collagen, and combinations thereof.

33. Process of claim 21 wherein said intensive sweetener is selected from the group consisting of aspartame, acetosulfam, saccharin and combinations thereof.

34. Process of claim 21 wherein a stick is inserted to enable hand-held eating after the partially frozen mixture is shaped.

35. Process of claim 21 wherein said fruit juice is selected from the group consisting of strawberry, cherry, orange, grape, blueberry, apple, watermelon, banana, peach, pear, pineapple, cranberry, blackberry, lemon, grapefruit, lime and coconut.

36. A process for producing a gelatin-free frozen confection which is ready-to-eat at freezer temperatures which comprises:
   (a) dissolving a hydrocolloid-containing mix in water at a temperature sufficient to dissolve the mix and form an aqueous mixture, said aqueous mixture comprised of:
      (i) hydrophilic colloid at a level of about 0.1% to 1.8% by weight, and stabilizer such that the hydrophilic colloid and stabilizer combined do not exceed 2% by weight, said hydrophilic colloid being selected from the group consisting of low methoxyl pectin, carrageenan, alginate and combinations thereof,
      (ii) food acid at a level of about 0.02% to 0.10% by weight, and
      (iii) carbohydrate sweetener at a level of about 5 to 50% by weight;
   (b) dynamically cooling the aqueous mixture such that partial freezing is accomplished at a temperature of from 10° F. to 32° F., said hydrophilic colloid of step (a) being effective to maintain the ice crystal structure produced during said partial freezing,
   (c) shaping said partially frozen mixture, and
   (d) freezing said shaped mix to a temperature of less than 10° F.

37. Process of claim 36 wherein said aqueous colloid-containing further comprises natural and/or artificial flavors.

38. Process of claim 36 wherein said aqueous mixture further comprises artificial color.

39. Process of claim 36 wherein said aqueous mixture further comprises a gelation catalyst in an amount effective to aid said hydrophilic colloid to gel.

40. Process of claim 39 wherein said gelation catalyst is a salt containing a metal ion chosen from the group consisting of calcium and potassium.

41. Process of claim 36 wherein said dynamic freezing further comprises aeration.

42. Process of claim 41 wherein said aeration is sufficient to produce an overrun of 3% to 250% by volume.

43. Process of claim 36 wherein said stabilizer is chosen from the group consisting of guar gum, xanthan gum, locust bean gum, gum arabic, carboxymethyl cellulose, hydroxy propyl methyl cellulose, hydroxy propyl cellulose, collagen and combinations thereof.

44. Process of claim 36 wherein said food acid is selected from the group consisting of adipic acid, fumaric acid, malic acid, citric acid, tartaric acid and combinations thereof.

45. A process for producing a gelatin-free frozen confection which is ready-to-eat at freezer temperatures which comprises:
   (a) dissolving a hydrocolloid-containing mix in water at a temperature sufficient to dissolve the mix and form an aqueous mixture, said aqueous mixture comprised of:
      (i) hydrophilic colloid at a level of about 0.1% to 1.8% by weight, and stabilizer such that the hydrophilic colloid and stabilizer combined do not exceed 2% by weight, said hydrophilic colloid being selected from the group consisting of low methoxyl pectin, carrageenan, alginate, and combinations thereof,
      (ii) carbohydrate sweetener at a level of about 5% to 50% by weight,
      (iii) food acid at a level of about 0.02% to 0.10% by weight,
      (iv) fruit juice at a level of less than 15% by weight;
   (b) dynamically cooling the aqueous mixture such that partial freezing is accomplished at a temperature of from 10° F. to 32° F., said hydrophilic colloid of step (a) being effective to maintain the ice crystal structure produced during said partial freezing,
   (c) shaping said partially frozen mixture, and
   (d) freezing said shaped mix to a temperature of less than 10° F.

* * * * *